Feb. 25, 1969   L. D. DRECHSLER ET AL   3,429,403
ARTICLE-HANDLING APPARATUS

Filed Aug. 10, 1966                                    Sheet 1 of 2

INVENTORS
LEON D. DRECHSLER
FRED S. ZANDELL

BY
ATTORNEY

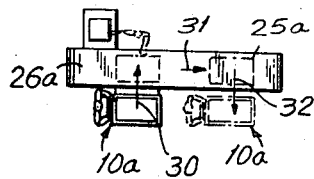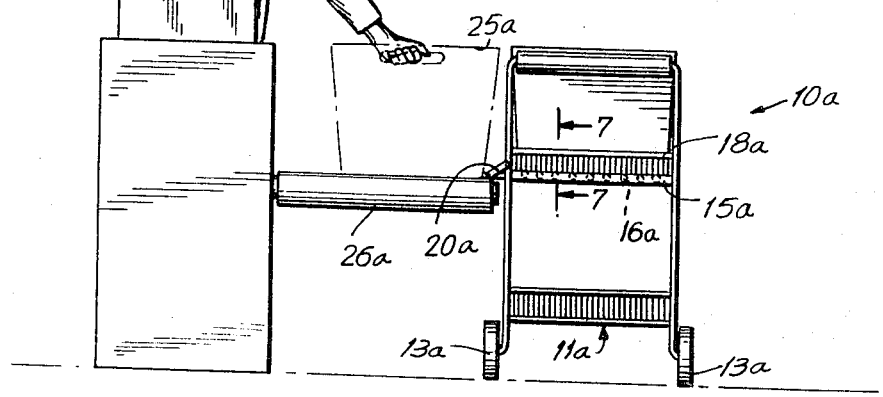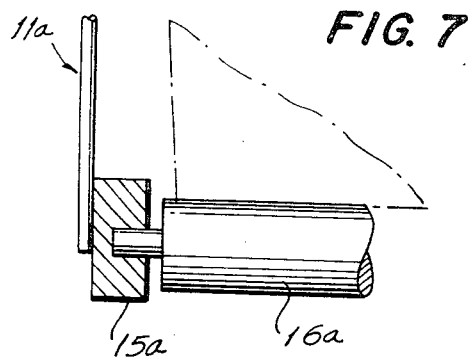

United States Patent Office 3,429,403
Patented Feb. 25, 1969

3,429,403
ARTICLE-HANDLING APPARATUS
Leon D. Drechsler, Lawrence Lane, Snedens Landing, Palisades, N.Y. 10964, and Fred S. Zandell, 207 E. 74th St., New York, N.Y. 10021
Filed Aug. 10, 1966, Ser. No. 571,474
U.S. Cl. 186—1          3 Claims
Int. Cl. E04h 3/04; B60p 1/52; B62b 3/04

ABSTRACT OF THE DISCLOSURE

This invention concerns itself essentially with an article-handling apparatus comprising a wheeled cart having a support for a tote box, said support comprising spaced rollers, the cart further having a gate at its front end which may be opened to permit transfer of the tote box from the support onto a counter top or conveyor belt.

---

This invention relates generally to article-handling apparatus, and is especially concerned with article-handling apparatus in conjunction with checking counters.

While the apparatus of the present invention has been primarily developed and employed for use in conjunction with the checkout counters of supermarkets and the like, and will be illustrated and described hereinafter with particular reference thereto, it is appreciated that the invention is capable of many varied applications all of which are intended to be comprehended herein.

As is well known to those versed in the art, the checkout procedure in supermarkets remains a tedious and laborious operation, usually the bottleneck in an otherwise smoothly running procedure. Time-study analysis has shown the supermarket checkout operation particularly time-consuming in the shopper's individual handling of articles to transfer the same from a conventional shopping cart to the checkout counter, and further time-consuming in the bagging operation wherein supermarket personnel must reach high over and down into a bag to place each individual article in a shopping bag for removal by the purchaser.

In accordance with the instant invention, the above-mentioned difficulties of supermarket checkout procedure are eliminated, the shopper merely placing a single container or tote box on the checkout counter, and the supermarket personnel more quickly and easily loading the tote box for removal by the shopper.

It is still a further object of the present invention to provide a shopping cart constructed in accordance with the instant invention, which is extremely simple in structure, eliminating the relatively high side walls previously required, for substantial savings in cost.

It is a further object of the present invention to provide article-handling apparatus which considerably reduces article-checking time and labor, to effect substantial savings in supermarket floorspace and labor costs, while affording added convenience to the shopper in faster checkout and more convenient handling of the purchased articles.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 5 is a top plan view illustrating an alternative flow or articles through a checkout station;

FIGURE 6 is an end elevational view illustrating supermarket personnel removing articles from a shopping cart; and FIGURE 7 is a partial sectional elevational view taken generally along the line 7—7 of FIGURE 6, enlarged for clarity.

Figure 1:
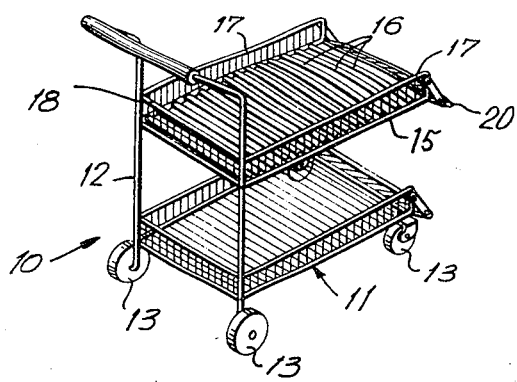
FIGURE 1 is a top, rear perspective view illustrating a shopping cart constructed in accordance with the teachings of the present invention.
Figure 2:
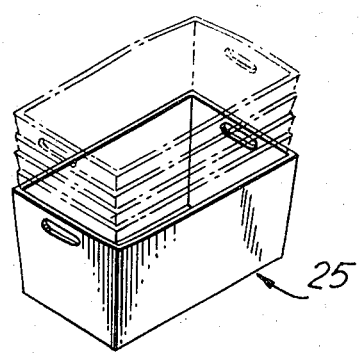
FIGURE 2 is a top perspective view illustrating a plurality of nested tote boxes in accordance with the instant invention.
Figure 3:
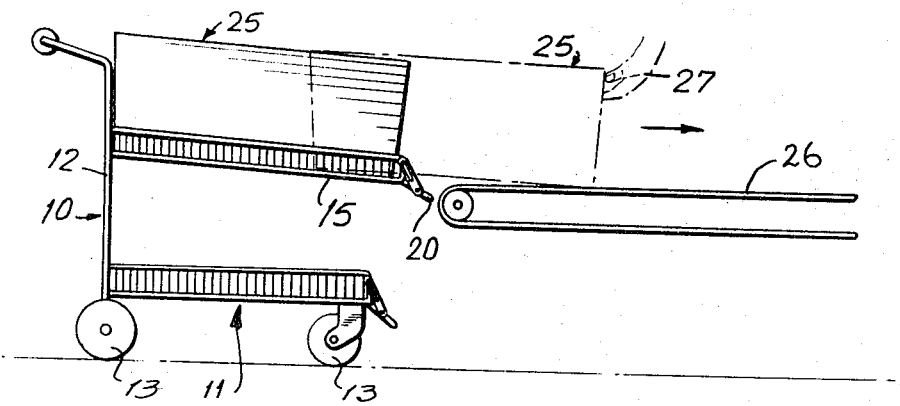
FIGURE 3 is a side elevational view illustrating operation of the instant apparatus, wherein articles to be checked are being placed on the checkout counter.

Referring now more particularly to the drawings, and specifically to FIGURES 1–4 thereof, a shopping cart 10 is illustrated in FIGURES 1 and 3 as including a generally rectangular frame 11, which may be provided with an upstanding handle support 12. At its lower regions, the frame 11 carries rotatable ground-engageable wheels 13, which may be conventional for movement along a supermarket floor.

The cart frame 11 and handle support 12 may be fabricated of wirework, or otherwise, as desired.

At an elevated position on the cart frame 11, say projecting from the upstanding handle support 12, there may be provided a platform or support 15, say of an open generally rectangular configuration disposed in a generally horizontal plane. The support 15 may be elongate forwardly and rearwardly of the cart 11, and provided at spaced intervals with a plurality of parallel rollers 16. That is, the rollers 16 may all be substantially identical, extending in parallelism transversely of the support 15 and cart 10, and arranged in a row between opposite ends of the support. The plurality of rollers 16 may have their opposite ends suitably journaled in opposite sides of the open support 15.

Extending along the sides of the support 15, upstanding therefrom, may be side fences 17; and, a rear end fence 18 may extend along the rear end of the support at an elevation thereabove. Along the front end of the support 15 may be provided a gate 20 mounted for swinging movement about an axis generally parallel to that of the rollers 16 for swinging movement between an upstanding closed position, and a forwardly and downwardly declining open position. In the embodiment of FIGURES 1–4, the support 15 may decline forwardly toward the gate 20.

In conjunction with the shopping cart 10 there may be employed tote boxes, as at 25 of a size to seat on the rollers 16 within the fence means 17 and 18, and gate 20, when the latter is closed. Thus, a shopper may collect the various desired articles in a tote box 25 on the rollers 16; and, the tote box, together with its contents, may be rolled from the support 15 direcly onto an endless conveyor belt 26 of a checkout counter, as shown in FIGURE 3. That is lowering of the gate 20 permits easy movement of the tote box 25 onto the checkout conveyor 26, as by a guiding hand 27. Of course, the tote box may be moved to a stationary checkout counter (without an endless belt) in similar manner.

Figure 4:
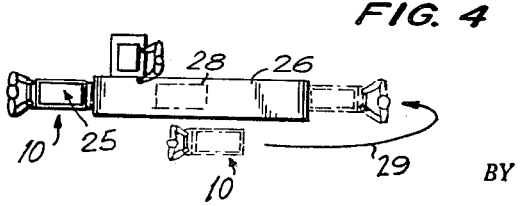
FIGURE 4 is a top plan view illustrating the flow of checked articles through the checkout station.

A tote box removed from the cart 10, is shown at 28 in FIGURE 4 seated on a checkout counter 26. After unloading of the tote box from the cart, the shopper may wheel the cart to the discharge end of the checkout counter, as along the direction of arrow 29, for return of the tote box, with its checked contents to the cart.

A slightly modified embodiment is shown in FIGURES 5-7, a shopping cart being there designated 10a, including a frame 11a having ground-engageable wheels 13a and an elevated open support 15a. The support 15a is provided with a plurality of generally parallel, rotatable rollers 16a, which rollers extend longitudinally of the support 15a, being journaled at the forward and rearward ends thereof. The rollers 16a are arranged in a generally horizontal plane, and the support 15a may be provided with fencing, as along its rear side at 18a, and also along one longitudinal side and the front end (not shown in the drawings). Along the other side of the support 15a there may be provided a gate 20a swingable downwardly to an open position, as illustrated in FIGURE 6, and swingable upward to a closed position.

The tote box 25a may rest on the rollers 16a of support 15a and be moved laterally off the support, rolling on the rollers, to a checkout conveyor 26a when the side gate 20a is opened. This procedure is illustrated in FIGURE 5 by the arrow 30 indicating the direction of tote-box removal from the cart 10a. Arrow 31 indicates the movement of the tote box along the counter 26a during checkout of the purchased articles, and arrow 32 indicates the direction of tote-box movement for return to the cart 10a after the contained articles have been checked.

Of course, it will also be readily apparent that the personnel at the check-out counter may keep an extra empty tote box on the conveyor or counter top for the expeditious handling of items by simply removing same from a full box, which has been pulled onto the counter and into juxtaposition with the empty box, and then after recording each item on the cash register, transfer such item into the previously empty box. The then full box can be re-deposited onto the cart, as aforesaid, and the newly emptied tote box kept in readiness for the next full tote box.

It will also be apparent that the same cart may then be utilized to transfer merchandise in the tote box to a parking lot where the full tote box may be removed, for example, onto the tail gate of a station wagon, in like fashion as previously described for transferring the tote box on and off from the counter top or conveyor belt.

From the foregoing, it is seen that the present invention provides article-handling apparatus for supermarkets and the like which fully accomplish its intended objects and is well adapted to meet practical conditions of manufacture and use.

Although the present invention has been described in some detail by way of illustration and example for purposes of clarity of understanding, it is understood that certain changes and modifications may be made within the spirit of the invention.

What is claimed it:

1. Article-handling apparatus for supermarkets and the like, said apparatus comprising an article-checking counter, a wheeled cart, a support on said cart approximately level with said counter, a plurality of rollers mounted on said support in a generally horizontal plane for rotation about generally parallel axes, and a tote box supported on said rollers for movement thereon between said support and counter, in combination with a gate upstanding from one edge of said support generally parallel to said rollers for retaining said box against movement and being openable to permit box movement, said gate being mounted for up-and-down swinging movement between its closed and opened positions about an axis generally parallel to that of said rollers, said plane of rollers declining toward said gate, said roller axes extending generally transverse of said cart for box movement generally longitudinally of said cart, and said gate upstanding from the front edge of said support, in combination with fence means about the remaining edges of said support.

2. Article-handling apparatus according to claim 1, said counter comprising an endless conveyor for conveying said box from a first point for receiving said box from said support to a second point for transferring said box from said counter to said support.

3. Article-handling apparatus according to claim 1, said roller axes extending generally longitudinally of said cart for box movement transversely of said cart, and said gate upstanding from a side edge of said support.

References Cited

UNITED STATES PATENTS

| | | | |
|---|---|---|---|
| 2,286,548 | 6/1942 | Jackson et al. | |
| 2,813,642 | 11/1957 | Fisher | 214—84 |
| 3,115,975 | 12/1963 | Thompson | 214—44 |
| 3,297,108 | 1/1967 | Davis | 186—1 |

ROBERT G. SHERIDAN, *Primary Examiner.*

U.S. Cl. X.R.

214—44, 84